April 12, 1938.   O. H. GRUNDEMAN   2,114,140
REINFORCED CONCRETE LAND PACKER
Filed Jan. 5, 1937    2 Sheets-Sheet 1
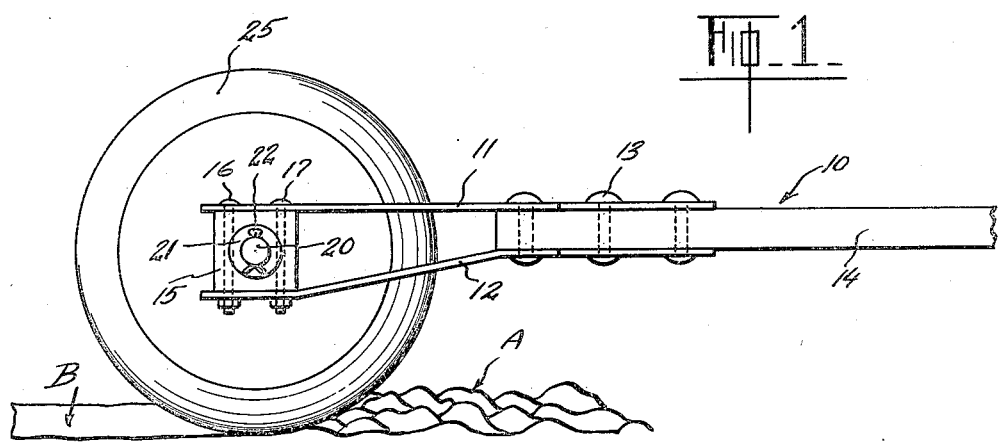
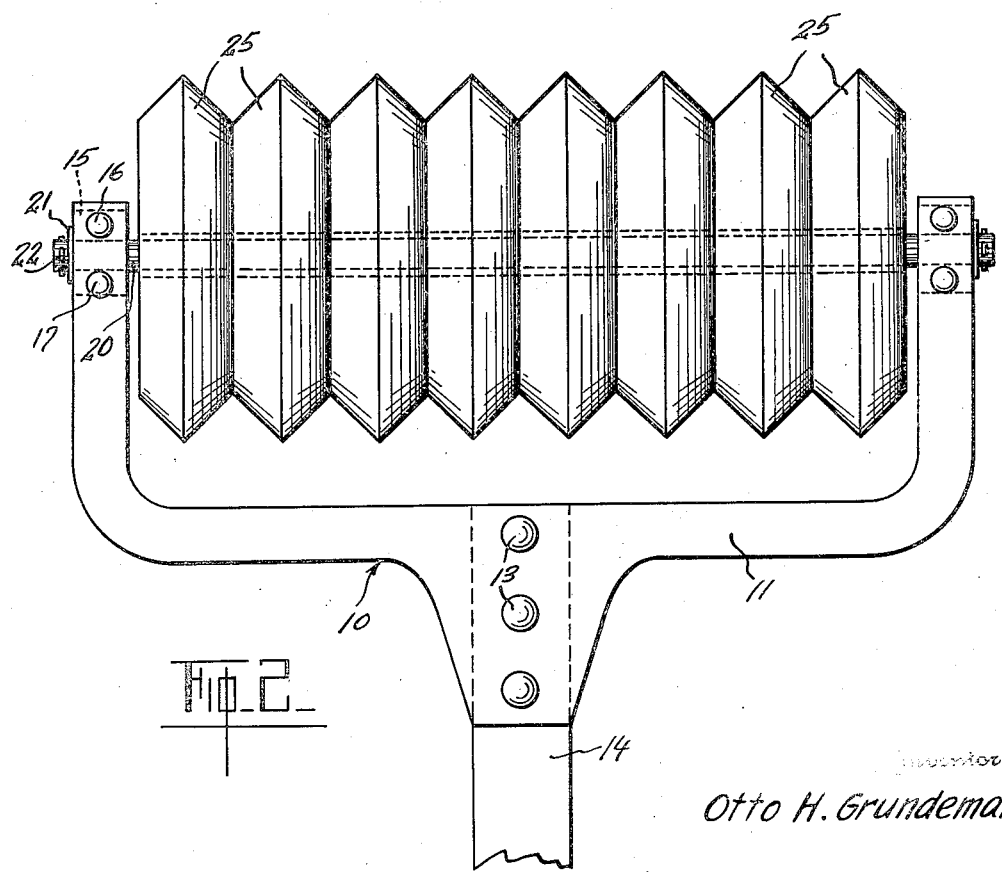
Otto H. Grundeman
By Carl Miller
Attorney

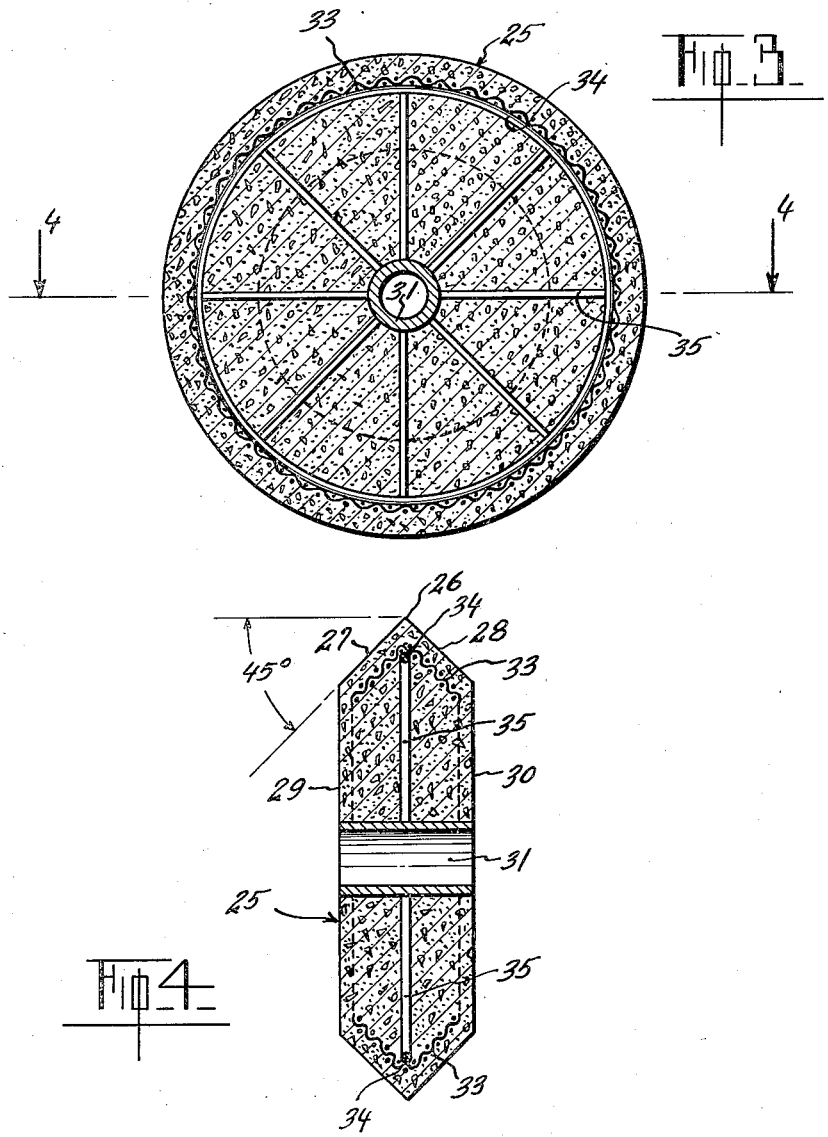

Patented Apr. 12, 1938

2,114,140

UNITED STATES PATENT OFFICE 2,114,140

REINFORCED CONCRETE LAND PACKER

Otto H. Grundeman, Holton, Kans.

Application January 5, 1937, Serial No. 119,070

3 Claims. (Cl. 55—77)

This invention relates to improvements in agricultural implement wheels, more particularly with reference to implements provided with pulverizing wheels arranged in gangs and rotatably supported on an axle for pulverizing and mulching the soil.

The principal object of this invention relates to forming such wheels of reinforced concrete and mounting a plurality of the same in side by side relationship on a common axle whereby the weight of such wheels will act to compact loose soil prior to seeding as well as after the seed has been sown.

Another object of this invention relates to the rim construction of the concrete wheels which is formed V-shape and the manner of reinforcing said rims as well as the body of said wheels.

With these and other objects in view which will become apparent as the description proceeds, the invention consists in the combination and arrangement of parts set forth below, claimed in the claims and shown in the drawings, in which:

Figure 1 is a side elevational view of the pulverizing wheels and supporting frame.

Figure 2 is a plan view showing a gang of pulverizing wheels and the supporting frame.

Figure 3 is a vertical section through one of the pulverizing wheels.

Figure 4 is a transverse sectional view taken on line 4—4, Figure 3.

In the figures like reference characters denote like parts in the various views. Referring to the drawings 10 denotes a frame comprising an upper U-shaped member 11 and a lower U-shaped member 12 rigidly connected at their intermediate portion by the rivets or bolts 13 to a drawbar 14. Arranged between the free ends of the arms of the U-shaped members are bearing blocks 15, rigidly connected to the ends of said arms by the bolts 16 and 17. Extending between the arms of the U-shaped frame member is a shaft or axle 20 the ends of which are mounted in the bearing blocks 15. Washers 21 and cotter pins 22 at the projecting ends of the shaft are to retain the same in position.

Mounted on the shaft 20 are a gang of pulverizing or land packer wheels 25, arranged in abutting relation with relation with respect to each other.

In Figures 3 and 4 there are shown sectional views of a preferred form of wheel or roller. As heretofore expressed each wheel or roller 25 is made of concrete cast in a suitable mold or form. For most purposes, the preferred dimensions of each wheel or roller is 16" diameter and 5" thickness. The rim 26 is made V-shaped or beveled with the sides 27 and 28 inclined 45 degrees to the vertical center plane of the wheel. The approximate total weight of each wheel or roller is 57 pounds, it being understood that other dimensions may be utilized to provide a wheel or roller of any desired weight and size. The sides 29 and 30 of the wheel are made flat and parallel to each other. Disposed axially within the concrete wheel or roller 25 is a metal bearing bushing 31 the ends of which are flush with the sides 29 and 30.

Inasmuch as the wheels or rollers 25 are made of concrete I have provided within the rims 26 thereof a reinforcement 33. This reinforcement consists of a suitable heavy wire mesh of any desired gauge, bent V-shaped with the sides thereof preferably at right angles to each other, the whole being shaped into the form of an annulus. Positioned within the apex or V of the mesh reinforcement is a heavy wire ring 34 which acts to maintain the reinforcement in its annular form. In order that when pouring the concrete into the form the position of the reinforcement be not disturbed, there is provided on the wire ring 34 radial wire struts 35 suitably connected at one end in any desired manner (not shown) to the wire ring 34, the other ends of said struts being likewise attached to the outer surface of the bearing bushing 31; said wire struts functioning to center the mesh reinforcement as well as to maintain the same in position. The use of the struts 35 is entirely optional and may be omitted if desired as other means known in the art may be utilized for maintaining the wire mesh in position. The radial struts 35 are shown in the vertical center plane of the wheel or roller and in this position do not function as a reinforcement. However if such radial struts are provided in pairs one on each side of the vertical center plane they will function as reinforcements for the sides of the wheel.

The wheels or rollers 25 are mounted on the shaft 20 in abutting side by side relationship, the gang of wheels or rollers 25 shown in Figure 2 numbering eight. Thus, when rolled over plowed or loose soil of the character as indicated at A, Figure 1, the same will be compacted down as indicated at B.

The use of concrete wheels or rollers as a pulverizer or land packer is decidedly superior than the more expensive steel roller type. The concrete rollers as will be appreciated may be made in any desired size with the bevel edges of the rim of any desired angularity and dimensions. They may be assembled in any number as the condition may warrant on a shaft of any size, and will provide a land roller of great efficiency and low cost.

Having thus described a preferred embodiment of my invention, without having attempted to set forth all the forms in which it may be made, or all the modes of its use, what I claim, and desire to secure by Letters Patent, is:—

1. A wheel for a land packer formed of reinforced concrete and comprising a cylindrical body portion having flat parallel sides, a V-shaped rim portion, a metallic bearing bushing embedded within and disposed axially of said wheel, a V-shaped metallic reinforcement arranged within said rim portion in concentric relation with the sides thereof, a stiff wire ring disposed in the V of said metallic reinforcement, and a plurality of radially disposed rods connected at their inner ends to said bearing bushing and at their outer ends to said wire ring.

2. A concrete wheel or roller comprising a body portion having flat parallel sides, a V-shaped rim portion, a metallic bearing bushing embedded within and disposed axially of said wheel or roller, the ends of said bushing terminating in the plane of said sides, and a V-shaped annular wire mesh reinforcement arranged within said rim portion with the inclined sides thereof disposed in substantial parallelism with the inclined sides of said V-shaped rim portion.

3. In the concrete wheel or roller as set forth in claim 2, including a stiff wire ring disposed in the V of said wire mesh reinforcement.

OTTO H. GRUNDEMAN.